(12) United States Patent
Enomoto et al.

(10) Patent No.: US 7,143,608 B2
(45) Date of Patent: Dec. 5, 2006

(54) BURNER FOR SYNTHESIZING GLASS PARTICLES AND METHOD FOR PRODUCING POROUS GLASS BODY

(75) Inventors: Tadashi Enomoto, Kanagawa (JP); Yuichi Ohga, Kanagawa (JP); Nobuya Akaike, Kanagawa (JP); Haruhiko Aikawa, Kanagawa (JP); Takashi Matsuo, Kanagawa (JP); Motonori Nakamura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 384 days.

(21) Appl. No.: 10/791,826

(22) Filed: Mar. 4, 2004

(65) Prior Publication Data
US 2004/0168472 A1 Sep. 2, 2004

Related U.S. Application Data

(62) Division of application No. 09/952,502, filed on Sep. 14, 2001, now Pat. No. 6,725,690.

(30) Foreign Application Priority Data
Sep. 14, 2000 (JP) ............... P. 2000-279550
Aug. 3, 2001 (JP) ............... P. 2001-236248

(51) Int. Cl.
*C03B 19/06* (2006.01)

(52) U.S. Cl. ............... 65/17.4; 65/531; 65/414; 239/270; 431/127; 431/129; 431/153; 431/177

(58) Field of Classification Search ............... 65/17.4, 65/531, 414; 239/270; 431/127, 129, 153, 431/177
See application file for complete search history.

(56) References Cited

U.S. PATENT DOCUMENTS 4,618,354 A 10/1986 Suda et al.
4,826,520 A 5/1989 Kawazoe et al.

FOREIGN PATENT DOCUMENTS

| EP | 0 204 461 | 12/1986 |
|---|---|---|
| EP | 0 237 183 A1 | 9/1987 |
| GB | 2 363 637 A | 8/2000 |
| JP | 61-183140 | 8/1986 |
| JP | 62-187135 | 8/1987 |
| JP | 63-55135 | 3/1988 |
| JP | 5-105468 | 4/1993 |
| JP | 6-247722 | 9/1994 |

*Primary Examiner*—Mark Halpern
(74) *Attorney, Agent, or Firm*—McDermott Will & Emery LLP

(57) ABSTRACT

A concentric multi-tubular burner for synthesizing glass particles having a center port group constituted by a combination of jet ports of raw material gas, combustible gas and oxygen gas, wherein an outer wall of the oxygen gas jet port in the center port group protrudes more toward a burner head than an inner wall of the oxygen gas jet port. The flow rate of oxygen gas jetted from the oxygen gas jet port of the center port group is controlled to be in a proper range.

5 Claims, 2 Drawing Sheets

BURNER FOR SYNTHESIZING GLASS PARTICLES AND METHOD FOR PRODUCING POROUS GLASS BODY

This application is a divisional of application Ser. No. 09/952,502 filed 14 Sep., 2001, now U.S. Pat. No. 6,725,690.

BACKGROUND OF THE INVENTION

1. Field of the Invention

The present invention relates to a burner for synthesizing glass particles and a method for producing porous glass body in order to manufacture glass articles by a vapor phase synthesis method.

2. Description of the Related Art

As a method for obtaining a porous glass body which is a precursor for manufacturing various glass articles such as optical fibers, photo-mask materials, quartz glass, etc., there is generally used a vapor phase synthesis method such as a VAD (Vapor Phase Axial Deposition) method, an OVD (Outside Vapor Deposition) method, or the like. In such a method, raw material gas ($SiCl_4$ or the like), combustible gas (hydrogen, methane, propane, or the like), and combustion-support gas (oxygen, or the like) are jetted from a plurality of different ports and mixed with one another to thereby form flames. The glass raw material is subjected to an oxidation reaction or a hydrolytic reaction in the flames formed thus so as to form glass particles flow. Then, the glass particles are deposited sequentially at a front end of a starting rod or around the starting rod.

Such a vapor phase synthesis reaction progresses in an area which is somewhat away from the outlets of the respective ports and in which the respective gases are mixed with one another. FIGS. 3A and 3B schematically show an example of the state of a reaction with which raw material is hydrolyzed or oxidized in a burner. In this example, a burner 16 includes gas jet ports formed in four layers concentrically, and glass raw material/combustible gas 9 is fed to a center port of the burner 16 while combustible gas 10, seal gas 11 and oxygen gas 12 are fed outside the center port. Thus, flames are formed to make a reaction. In a reaction area 13 in FIG. 3A, a hydrolytic reaction or oxidation reaction progress in accordance with the following formula. That is, in such a vapor phase synthesis method, effective mixture of the raw material and so on is a necessary condition for the improvement of the particles glass production efficiency, hence the improvement of the porous glass body deposition efficiency and the improvement of the raw material yield. Incidentally, in FIG. 3A, the reference numeral 14 represents a raw material gas/combustible gas development area, and 15, an oxygen gas development area.

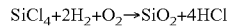

$$SiCl_4 + 2H_2 + O_2 \rightarrow SiO_2 + 4HCl$$

As the burner for synthesizing glass particles in such a vapor phase synthesis method, there are known a concentric multi-tubular burner (Japanese Patent Unexamined Publication No. Sho. 61-183140, Japanese Patent Unexamined Publication No. Sho. 63-55135, etc.) in which a plurality of coaxial cyclic ports are disposed concentrically, a multi-nozzle burner (Japanese Patent Unexamined Publication No. Sho. 62-187135, Japanese Patent Unexamined Publication No. Hei. 6-247722, etc.) in which either combustion-support gas or combustible gas is fed from a plurality of individual nozzles, and so on.

In the concentric multi-tubular burner, raw material gas, combustion-support gas and combustible gas are jetted from coaxial cyclic ports disposed concentrically and mixed with one another to make the raw material undergo a hydrolytic reaction or an oxidation reaction in oxyhydrogen flames. Although the concentric multi-tubular burner has a merit to be manufactured easily, the jet directions of the raw material gas, the combustible gas (combustion gas) and the oxidizing gas (combustion-support gas) from opening end of the burner are substantially parallel with one another so that it cannot be said that the efficiency of mixing these gases is good. Therefore, it cannot be also said that the efficiency of the hydrolytic reaction or the oxidation reaction from the raw material to the glass particles is sufficiently high. Thus, there is a problem that the raw material yield (the ratio of the produced quantity of the porous glass body to the input quantity of the raw material) is comparatively low.

On the other hand, in the multi-nozzle burner, combustion-support gas or combustible gas is jetted from individual small-diameter nozzles so that raw material gas, combustion-support gas and combustible gas are mixed with one another to make the raw material undergo a hydrolytic reaction or an oxidation reaction in oxyhydrogen flames. The efficiency of gas mixture is high so that the efficiency of the vapor phase synthesis reaction increases and the raw material yield is improved. In addition, the flow rate of the gas jetted from each small-diameter nozzle is higher than that of another gas on the periphery thereof, and the flames are stable because of an excellent directivity, a small flow volume, and soon. However, in the multi-nozzle burner, a large number of small-diameter nozzles have to be disposed in a limited area of the burner. Thus, it takes a lot of trouble to manufacture the multi-nozzle burner in comparison with the concentric multi-tubular burner. In addition, the positions and directions of the nozzles affect the reaction extremely delicately, so that the raw material yield varies largely due to a slight displacement in the burner structure (nozzle layout or the like). Thus, there is a problem that it is difficult to obtain a stable burner performance and hence a stable porous glass body producing capacity.

As described above, in the multi-nozzle burner, oxygen or the like can be jetted toward the center portion (toward the raw material) from the small-diameter nozzles having directivity. Thus, the efficiency of mixture among raw material gas, combustion-support gas and combustible gas is high so that porous glass can be deposited with a high yield. On the contrary, there is a problem that the form of the nozzles largely affects the efficiency of deposition of the porous glass (there is a large individual difference among burners). In fact, it takes a lot of trouble to manufacture a large number of nozzles.

On the other hand, it is much easier to manufacture (to control the manufacturing of) the concentric multi-tubular burner than the multi-nozzle burner. However, a problem inheres in the concentric multi-tubular burner so that the efficiency of mixture among raw material gas, combustion-support gas and combustible gas is not as high as that conducted in the multi-nozzle burner. As a result of investigation of this reason, it was proved that the oxygen quantity diffusing to the center portion of the raw material was not always sufficient (in an oxygen diffusion rate-determining process). However, it was proved that if the supply oxygen quantity was increased, the temperature of the flames fell so that the efficiency of reaction of the raw material also dropped. It was therefore proved that simple increase in oxygen quantity could not solve the problem.

As a method for controlling refractive index of the optical fiber transmission area, there is a method for adding a proper quantity of $GeO_2$ to $SiO_2$ which is a main component of optical fibers. To add $GeO_2$ to $SiO_2$, there is generally used a method for supplying $SiCl_4$ and $GeCl_4$ simultaneously as raw material gas, more specially, for applying a proper quantity of $GeCl_4$ which is a raw material of $GeO_2$, as well as $SiCl_4$ which is a raw material of $SiO_2$, to the burner to deposit glass particles on a predetermined area when porous glass body which is a precursor for optical fiber. A glass particles synthesizing burner and a porous glass body producing method by use of the burner according to the present invention is effectively available when such mixed gas is used as raw material gas.

Oxygen diffusing and developing in the vicinity of the raw material flow is mainly consumed by the hydrolytic reaction of $SiCl_4$ because the equilibrium constant of the hydrolytic reaction of $GeCl_4$ is much smaller than that of $SiCl_4$. Accordingly, in the case where $SiCl_4$ and $GeCl_4$ are mixed and fed into a raw material port, the hydrolytic reaction of $SiCl_4$ progresses dominantly over the hydrolytic reaction of $GeCl_4$, and thus reaction efficiency of $GeCl_4$ is lowered. Therefore, to obtain a desired density of $GeO_2$, it is necessary to apply excessive $GeCl_4$.

According to a glass particles synthesizing burner and a porous glass body producing method by use of the burner of the present invention, oxygen closest to raw material is diffused toward the center portion so effectively that a larger amount of oxygen can be fed to the raw material development area. Thus, not only the hydrolytic reaction of $SiCl_4$ but also the hydrolytic reaction of $GeCl_4$ are accelerated remarkably. As a result, the reaction efficiency of $SiCl_4$ and $GeCl_4$, particularly, that of $GeCl_4$, increases remarkably while the deposition speed of glass particles is enhanced.

SUMMARY OF THE INVENTION

In consideration of the foregoing problems in the background art, an object of the present invention is to provide a glass particles synthesizing burner which is a concentric multi-tubular burner easy to be manufactured, which is high in efficiency of mixture among raw material gas, combustion-support gas and combustible gas, and which can obtain a high raw material yield; and to provide a porous glass body producing method by use of such a glass particles synthesizing burner.

The present invention includes the following aspects (1) to (10) as means for solving the foregoing problems.

(1) A concentric multi-tubular burner for synthesizing glass particles, comprising: a center port group constituted by a combination of a jet port of raw material gas, a jet port of combustible gas, and a jet port of oxygen gas, or a combination of a jet port of raw material gas and combustible gas, a jet port of combustible gas, and a jet port of oxygen gas, or a combination of a jet port of raw material gas and combustible gas, and a jet port of oxygen gas, the jet ports being provided in the order of increasing distance from the center, (seal gas ports for jetting inert gas may be provided between the respective ports). In concentric multi-tubular burner, an outer wall of the oxygen gas jet port of the center port group more protrudes toward a head of the burner than an inner wall of the oxygen gas jet port, and a protruding length of the outer wall is not shorter than 30 times as large as a gap of the oxygen gas jet port.

(2) A burner for synthesizing glass particles according to the above aspect (1), wherein an outside port group having a jet port of combustible gas and a jet port of oxygen gas may be provided outside the center port group.

(3) A burner for synthesizing glass particles according to the above aspect (1) or (2), wherein the combustible gas may be hydrogen gas.

(4) A burner for synthesizing glass particles according to anyone of the above aspects (1) to (3), wherein the protruding length of the outer wall of the oxygen gas jet port of the center port group may be not longer than 9 times as large as an inner diameter of the outer wall.

(5) A burner for synthesizing glass particles according to the above aspect (4), wherein the protruding length of the outer wall of the oxygen gas jet port of the center port group may be not longer than 8 times as large as the inner diameter of the outer wall.

(6) A porous glass body producing method by a vapor phase synthesis method in which glass raw material gas undergoes a hydrolytic reaction or an oxidation reaction in flames; wherein by use of a glass particles synthesizing burner defined in any one of the above aspects (1) to (5), a flow rate of oxygen gas jetted from the oxygen gas jet port of the center port group is not lower than 1.2 times as high as an average flow rate of gases jetted from ports inner than the oxygen gas jet port. The average flow rate means the value obtained by dividing the total jet ports sectional area into total flow rate of inner gases.

(7) A porous glass body producing method according to the above aspect (6), wherein the flow rate of oxygen gas jetted from the oxygen gas jet port of the center port group may be not lower than 1.35 times as high as the average flow rate of gases jetted from ports inner than the oxygen gas jet port (total flow rate of inner gases/the jet ports sectional area).

(8) A porous glass body producing method according to the above aspect (6) or (7), wherein the flow rate of oxygen gas jetted from the oxygen gas jet port of the center port group may be not lower than 3.0 m/s.

(9) A porous glass body producing method according to any one of the above aspects (6) to (8), wherein the flow rate of oxygen gas jetted from the oxygen gas jet port of the center port group may be not higher than 50 m/s.

(10) A porous glass body producing method according to any one of the above aspects (6) to (9), wherein the protruding length of the outer wall of the oxygen gas jet port in the center port group may be not longer than 8 times as large as the inner diameter of the outer wall, and time for all gases inner than the outer wall to pass inside the outer wall is not longer than 50 ms (milliseconds).

According to the present invention, there is provided a concentric multi-tubular burner for synthesizing glass particles, comprising: a center port group constituted by a combination of a jet port of raw material gas, a jet port of combustible gas, and a jet port of oxygen gas, or a combination of a jet port of raw material gas and combustible gas, a jet port of combustible gas, and a jet port of oxygen gas, or a combination of a jet port of raw material gas and combustible gas, and a jet port of oxygen gas, the jet ports being provided in the order of increasing distance from the center. In addition, the concentric multi-tubular burner may be provided with an outside port group outside the center port group. The outside port group includes a combustible gas jet port and an oxygen gas jet port. The structure of the outside port group is not limited specifically. The outside port group may have a structure such that at least one pair of a combustible gas jet port and an oxygen gas jet port may be provided concentrically outside the center port group. Alternatively, one of the combustible gas jet port and the oxygen gas jet port may be provided concentrically around a plurality of the other gas jet ports so as to constitute a multi-nozzle burner system. Further, alternatively, the outside port group may be formed by the combination of these structures. In addition, such an outside port group may be provided with a port for feeding raw material gas in accordance with necessity.

Such a concentric multi-tubular burner belongs to an aspect in which oxygen gas is fed inward in the respective port groups. Incidentally, a seal gas port for jetting inert gas such as Ar, He, $N_2$ may be provided among the respective ports.

The glass particles synthesizing burner according to the present invention has a feature in the structure of its center port group, in which the outer wall of an oxygen gas jet port (hereinafter, referred to as "first oxygen gas jet port") in the outermost port of center port group protrudes more toward the burner head than the inner wall of the first oxygen gas jet port. Thus, oxygen gas forms a turbulent wall jet flow to diffuse inward while flowing along the wall surface. Since the wall surface is formed on only one side in the oxygen jetting direction, the diffusion of the oxygen gas is effectively developed inward so that the oxygen gas is diffused and mixed with raw material gas and combustible gas in the center portion efficiently. If the wall surface is short, the effect of diffusion and development toward the center portion is not exerted satisfactorily. Therefore, the protruding length of the outer wall is made 30 or more times as large as the gap of the first oxygen gas jet port (the gap between the inner surface of the outer wall and the outer surface of the inner wall).

From the point of view of accelerating turbulent diffusion of the oxygen gas toward the center portion based on the turbulent wall jet flow; preferably, the protruding length of the outer wall may be increased. However, if the outer wall is too long, raw material gas and glass particles diffuse from the center portion to the vicinity of the wall surface and begin to be deposited on the wall surface. To avoid such deposition, it is desired that the protruding length of the outer wall be set to be approximately 9 or less times as large as the inner diameter of the outer wall though it also depends on the flow rates of gases from the respective ports.

Incidentally, the outside port group formed outside the center port group having the above-mentioned structure may be designed so that the jetting ends of the respective ports are on a level with that of the protruding outer wall of the first oxygen gas jet port. The outside port group is generally constituted by a combustible gas jet port and an oxygen gas jet port (and an inert gas jet port if necessary) so as to have a function of forming flames for heating the glass particles deposit surface widely.

By use of the glass particles synthesizing burner configured thus, the flow rate of oxygen gas jetted from the first oxygen gas jet port is controlled to be 1.2 or more times, preferably 1.35 or more times as high as the average flow rate of gases jetted from ports inner than the first oxygen gas jet port (total flow rate of inner gases/jet port sectional area) Accordingly, the oxygen quantity diffused and fed to the center portion can be increased without increasing the absolute quantity of the oxygen gas (that is, without inducing a fall in temperature to thereby lower the reaction efficiency). Thus, a porous glass body can be produced with a high raw material yield. If the flow rate of oxygen gas from the first oxygen gas jet port is less than 1.2 times as high as the average flow rate of the inner gases, there cannot be obtained an effect that oxygen gas is brought into inward turbulent diffusion effectively.

When the combustible gas jetted from one and the same port as or the closest port to the raw material gas is hydrogen gas, the turbulent diffusion factor of oxygen gas increases relatively. Thus, the diffusion of oxygen gas toward the center portion is accelerated effectively so as to increase the efficiency of the reaction with which the raw material is vitrified.

In addition, it is preferable that the flow rate of oxygen gas jetted from the first oxygen gas jet port is set to be not lower than 3.0 m/s (m/second) in order to bring the oxygen gas into effective turbulent diffusion. However, if the port width (gap) of the first oxygen gas jet port becomes too narrow and the flow rate becomes too high, it becomes difficult for the oxygen gas to diffuse toward the center portion. In addition, the force generated by the flow of the oxygen gas along the wall surface to prevent raw material gas from diffusing from the center portion or to prevent produced glass particles from diffusing toward and adhering to the wall surface becomes weak. It is therefore preferable that the upper limit of the flow rate of oxygen gas is set to be about 20 m/s, or 50 m/s at maximum.

In the glass particles synthesizing burner according to the present invention, since the outer wall of the first oxygen gas jet port is protruded, there is a fear that glass particles adhere to the inner surface of the protruding portion of the outer wall so that the burner is finally clogged if the gas stays in the inside portion of the outside wall for a long time. It is therefore preferable that the protruding length of the outer wall is set to be 8 or less times as large as the inner diameter of the outer wall, and the time for all the gases inner than the outer wall to transit the inside of the outer wall is set to be not longer than 50 ms (milliseconds). The time to transit the inside of the outer wall herein means the average transit time (protruding length/average flow rate) in the inside of the outer wall (in the receding portion) calculated from the average flow rate (total gas flow rate in the inside portion/ opening portion sectional area) of gases in the receding portion.

To produce glass particles efficiently, it is preferable that gas arrangement is made so that raw material gas is placed at the center, and combustible gas exists at one and the same place as or at a closest place to the raw material gas (to raise the temperature of the reaction area) while oxygen gas is supplied to the reaction area from the surroundings. Particularly, in this arrangement form, oxygen gas is jetted from a comparatively narrow area. The oxygen gas is diffused and fed to the center portion efficiently if the following two conditions with respect to the structure of the jet port of the oxygen gas are satisfied. That is, the outer wall surface of the oxygen gas jet port should be more protruding than the inner wall surface thereof by the protruding length which is 30 or more times as large as the gap width of the inner wall surface. In addition, the flow rate of the oxygen gas should be 1.2 or more times as high as the average flow rate of gases inner than the oxygen gas. Thus, there is an effect that the oxidation reaction and the hydrolytic reaction of the raw material are accelerated in the center portion so that the reaction efficiency from the raw material to glass is enhanced remarkably. The structure of the burner satisfying such conditions, and the reaction conditions are essential for the present invention.

DETAILED DESCRIPTION OF THE PREFERRED EMBODIMENT

The effects of the present invention will be described below on the basis of Examples and Comparative Examples, but the present invention is not limited to these Examples.

EXAMPLES 1 TO 6, AND COMPARATIVE EXAMPLES 1 TO 4

Figure 1:
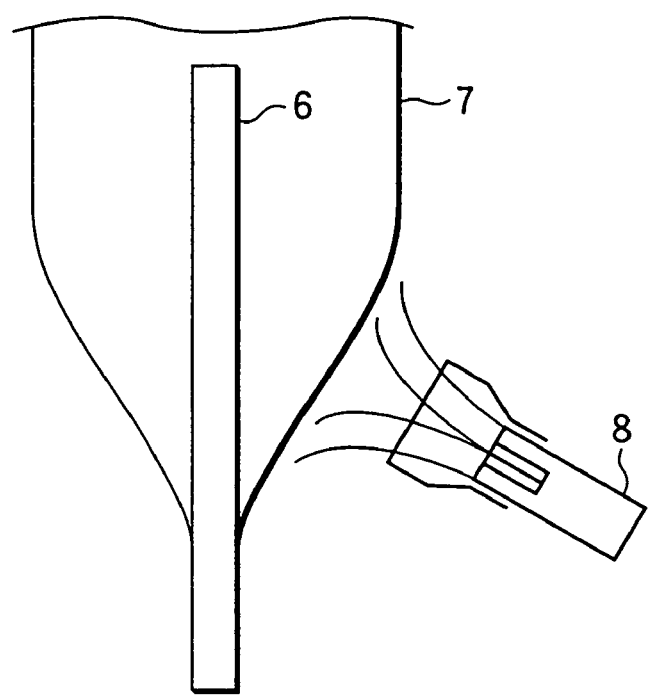
FIG. 1 is a schematic view showing a state to produce a porous glass body according to an embodiment of the present invention.

As shown in FIG. 1, glass particles were synthesized by use of a burner 8 for synthesizing glass particles according to the structure of the present invention, and a porous glass body was produced by a VAD method for depositing glass particles 7 around a starting rod 6.

Figure 2:
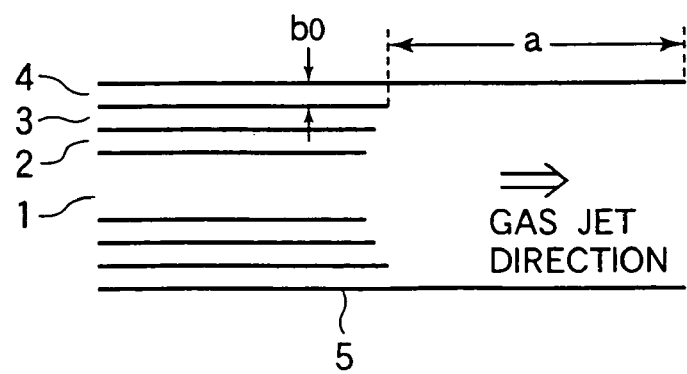
FIG. 2 is a schematic sectional view showing the structure of a center port group of a burner according to the embodiment of the present invention.
Figure 3A:
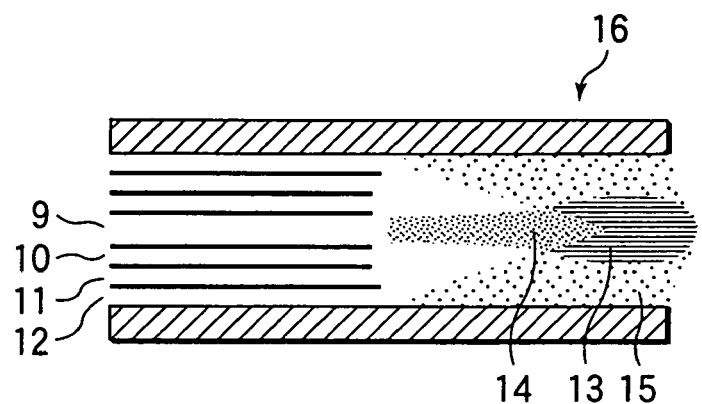
FIGS. 3A and 3B are respectively explanatory views schematically showing a state of a reaction with which raw material is vitrified in the burner.
Figure 3B:
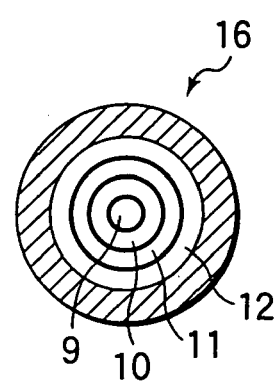

The burner 8 used was a concentric 16-tubular burner. A center port group 5 of the burner 8 was constituted by a first port 1 for jetting raw material gas ($SiCl_4$) and hydrogen gas, a second port 2 for jetting hydrogen gas, a third port 3 for jetting Ar gas which was seal gas, and a fourth port 4 (corresponding to the first oxygen gas jet port in the present invention) for jetting oxygen gas, as shown in its side view of FIG. 2. Outside this center port group 5, there were provided an outside port group with three groups for forming flames in combination of ($Ar/H_2/Ar/O_2$).

In the burner 8, as the fourth port 4 which was the first oxygen gas jet port, there were used a standard one which had an inner diameter of 20 mm and an outer diameter of 25 mm, and modified ones which were changed in the gap of the fourth port ($b_0$ in FIG. 2), the inner diameter of the fourth port outer wall (the outer diameter of the fourth port), and the protruding length (a in FIG. 2) as shown in Tables 1 and 2. Then, by use of the starting rod 6 having a diameter of 30 mm, glass particles were deposited under the conditions shown in Tables 1 and 2 so as to form a porous glass body having a diameter of 200 mm. When conditions such as the gap of the fourth port, the flow rate of oxygen gas, and so on, were changed, outside flames (mainly hydrogen flow rate) were adjusted so that the temperature in the glass particles deposited surface, the diameter of the porous glass body, and so on, were kept at target fixed values. The producing conditions and results (raw material yields) were shown in Table 1 (Producing Conditions and Results in Examples) and Table 2 (Producing Conditions and Results in Comparative Examples).

Here, the raw material yield is a value expressed by (C/B)×100(%) where C designates the weight of deposited glass particles and B designates the weight (theoretical yield) of glass particles when all the supplied glass raw material is formed into glass particles. Incidentally, on the assumption that the quantity of $SiCl_4$ supplied as glass raw material is A, the theoretical yield B of glass particles is expressed by B≈(A/170)×60.

TABLE 1

| Producing conditions and results | Ex. 1 | Ex. 2 | Ex. 3 | Ex. 4 | Ex. 5 | Ex. 6 |
|---|---|---|---|---|---|---|
| 1st to 3rd port average flow rate (m/s) | 3.1 | 3.5 | 2.0 | 1.79 | 3.1 | 1.4 |
| 4th port (oxygen) gap ($b_0$) (mm) | 2.0 | 2.0 | 2.0 | 2.0 | 2.0 | 1.5 |
| 4th port oxygen flow rate (m/s) | 4.6 | 5.2 | 6.0 | 3.3 | 4.7 | 3.1 |
| 1st to 4th port average flow rate (m/s) | 3.5 | 4.1 | 3.9 | 2.5 | 3.8 | 2.1 |
| 4th port protruding length (a) (mm) | 150 | 150 | 120 | 120 | 150 | 70 |
| Protruding length/4th port gap | 75 | 75 | 60 | 60 | 75 | 47 |
| 4th port flow rate/1st to 3rd port flow rate | 1.5 | 1.5 | 3.0 | 2.0 | 1.5 | 2.2 |
| Protruding length/1st to 4th port average flow rate (ms) | 43 | 37 | 31 | 49 | 39 | 33 |
| Protruding length/4th port outer diameter | 6 | 6 | 5.5 | 5.5 | 6.8 | 3.5 |
| Raw material yield (%) | 56 | 58 | 53 | 54 | 55 | 59 |

TABLE 2

| Producing conditions and results | Comp. 1 | Comp. 2 | Comp. 3 | Comp. 4 |
|---|---|---|---|---|
| 1st to 3rd port average flow rate (m/s) | 3.5 | 3.5 | 3.5 | 2.7 |
| 4th port (oxygen) gap ($b_0$) (mm) | 2.5 | 2.0 | 2.0 | 2.0 |
| 4th port oxygen flow rate (m/s) | 4.1 | 5.2 | 5.2 | 2.6 |
| 1st to 4th port average flow rate (m/s) | 3.8 | 4.1 | 4.1 | 2.6 |
| 4th port protruding length (a) (mm) | 150 | 58 | 230 | 120 |
| Protruding length/4th port gap | 60 | 29 | 115 | 60 |
| 4th port flow rate/1st to 3rd port flow rate | 1.2 | 1.5 | 1.5 | 0.98 |
| Protruding length/1st to 4th port average flow rate (ms) | 40 | 14 | 57 | 46 |
| Protruding length/4th port outer diameter | 5.8 | 2.3 | 9.2 | 5.5 |
| Raw material yield (%) | 50 | 42 | 48 | 49 |

Note:
1. 1st to 3rd port average flow rate = 1st to 3rd port total flow rate/1st to 3rd port opening area
2. raw material yield = (weight of deposited glass particles/theoretical weight of produced glass particles) × 100(%)
3. 4th port outer diameter = inner diameter of 4th port outer wall As was apparent from Tables 1 and 2, in the porous glass bodies in Embodiments 1 to 6 produced by use of the glass particles synthesizing burners according to the present invention and in the producing method according to the present invention, the raw material yield was excellent in a range of from 53% to 59%. On the other hand, in Comparative Example 1 in which the 4th port flow rate/1st to 3rd port average flow rate was 1.2, the raw material yield was 50%. It is considered that this was because the flow rate of the fourth port was not sufficiently high relatively to the average flow rate of the first to third ports so that turbulent diffusion of oxygen toward the center portion did not take place efficiently. In Comparative Example 4 in which the flow rate in the center portion was higher than that in the fourth port, diffusion of raw material toward the circumference was dominant over diffusion of oxygen toward the center portion. Thus, glass particles began to adhere to the inner wall of the protruding portion of the fourth port while the glass particles were being deposited, and the adhered mass was rapidly growing. Finally, there arose a trouble that the burner was clogged. The raw material yield shown in Table is a value before the burner was clogged.

Further, in Comparative Example 2 in which the protruding length of the outer wall of the fourth port was not sufficiently large relatively to the gap of the fourth port, the flux was released before turbulent diffusion of oxygen toward the center portion advanced. Thus, the raw material yield was low to be 42%. On the contrary, in Comparative Example 3 in which the protruding length of the outer wall of the fourth port was too large relatively to the gap of the fourth port, glass particles began to adhere to the inner wall of the protruding portion of the fourth port while the glass particles were being deposited. Finally, there arose a trouble that the burner was clogged. In addition, the raw material yield was 48%.

In the previously embodiment, only $SiCl_4$ was discussed as raw material to be flowed into the burner center, and it was referred to that the efficiency of hydrolytic reaction thereof was improved and a high raw material yield could be obtained.

Further, according to the invention, if "$GeCl_4$" and "$GeCl_4+SiCl_4$" are used as raw materials to be flowed into the burner center, there is an effect that the hydrolytic reaction efficiency and the raw material yield were likewise improved conspicuously.

EXAMPLE 7, AND COMPARATIVE EXAMPLES 5 AND 6

Glass particles were synthesized by use of a glass particles synthesizing burner according to the present invention. Then, a porous glass body was produced by a VAD method in which the glass particles were deposited sequentially from an end of a starting rod. The porous glass body was consolidated and the refractive of the consolidated body decreased in proportion to a square of a radial distance from the center portion to the outer circumferential portion, that is, the refractive index was GI type.

The burner 8 used was a concentric 8-tubular burner. The center port group of the burner 8 was constituted by a first port 1 for jetting raw material gas ($SiCl_4$ and $GeCl_4$) and hydrogen gas, a second port for jetting hydrogen gas, a third port for jetting Ar gas as seal gas, and a fourth port for jetting oxygen gas (corresponding to the first oxygen gas), as shown in its side view of FIG. 2. Outside the center port group 5, there were provided an outside port group for forming flames in combination of ($Ar/H_2/Ar/O_2$)

Figure 4:
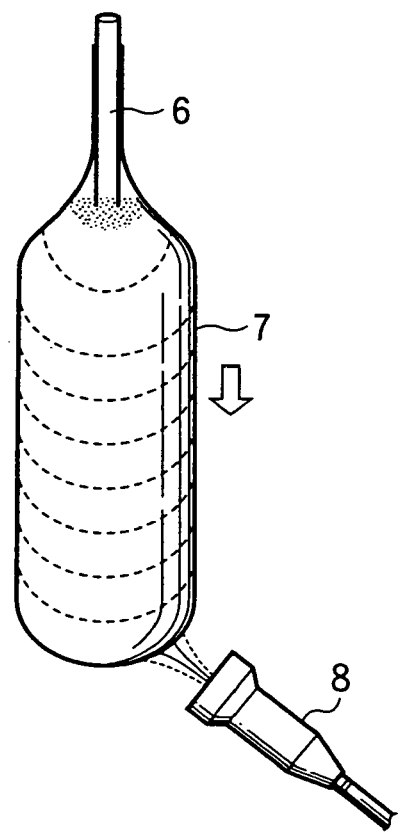
FIG. 4 is a schematic view showing a state of the deposited glass particles in Example 7.

As shown in FIG. 4, the starting rod 6 having a diameter of 20 mm is used, and glass particles 7 synthesized by the burner 8, were deposited from the end of the starting rod 6 under the conditions shown in Table 3 so as to form a porous glass body having a diameter of 130 mm. Table 3 shows the structure of major portions of the burner, and production conditions and results (raw material yield). The flames (mainly, the flow rate of hydrogen) formed by the outside port group were adjusted to keep the temperature of the surface where glass particles deposited, the diameter of porous glass body, etc. to constant values when the protruding length of the fourth port (which is indicated by a in FIG. 2), the gap of the fourth port (which is indicated by $b_0$ in FIG. 2), the flow rate of the oxygen gas and the like were changed.

TABLE 3

| Conditions and results | Ex. 7 | Comp. 5 | Comp. 6 |
|---|---|---|---|
| Inner diameter/outer diameter in 4th port | 18/20 | 18/23 | 18/20 |
| Ratio of $SiCl_4$ input quantity to $GeCl_4$ input quantity in raw material port | 8.5/1.0 | 8.5/1.0 | 8.5/1.0 |
| 1st to 3rd port average flow rate (m/s) | 1.49 | 1.49 | 1.49 |
| 4th port (oxygen) gap ($b_0$) (mm) | 1.0 | 2.5 | 1.0 |
| 4th port oxygen flow rate (m/s) | 7.26 | 2.69 | 7.26 |
| 1st to 4th port average flow rate (m/s) | 3.20 | 2.17 | 3.20 |
| 4th port protruding length (a) (mm) | 120 | 60 | 20 |
| Protruding length/4th port gap | 120 | 24 | 20 |
| 4th port flow rate/1st to 3rd port flow rate | 4.87 | 1.81 | 4.87 |
| Protruding length/1st to 4th port average flow rate (ms) | 37.5 | 27.6 | 9.4 |
| Protruding length/4th port outer diameter | 6.0 | 2.6 | 1.0 |
| Raw material yield ($SiCl_4/GeCl_4$) | 73/49 | 50/34 | 52/40 |

Note:
1. 1st to 3rd port average flow rate = 1st to 3rd port total flow rate/1st to 3rd port opening area
2. raw material yield = (weight of deposited glass particles/theoretical weight of produced glass particles) × 100(%)
3. 4th port outer diameter = inner diameter of 4th port outer wall As was apparent from Table 3, Example 7 showed a good result that the raw material yield of $SiCl_4$ was 73% and the raw material yield of $GeCl_4$ was 49%. On the other hand, in Comparative Example 5, the raw material yield of $SiCl_4$ was 50% and the raw material yield of $GeCl_4$ was 34%, and in Comparative Example 6, the raw material yield of $SiCl_4$ was 52% and the raw material yield of $GeCl_4$ was 40%. The raw material yields of $SiCl_4$ and $GeCl_4$ in Comparative Examples 5 and 6 lowered in comparison with those in Example 7. It is considered that this was because while the conditions of gap width and the protruding length of the fourth port and the raw material flow rate were optimized in Example 7, the fourth port gap width on the conditions in Comparative Example 5 was large so that the flow rate of the oxygen port became low and hence oxygen did not diffuse to the center portion satisfactorily. In Comparative Example 6, it was considered that the protruding length of the fourth port was small so that the flux was released before the turbulent diffusion of oxygen to the center portion advanced, thereby resulting in the raw material yield drop.

As mentioned above, by use of a glass particles synthesizing burner according to the present invention, the outer wall surface of a first oxygen gas jet port is made longer than the inner wall surface thereof so as to form a turbulent wall jet flow in which jet oxygen gas flows toward the center portion. The ratio of the flow rate of oxygen gas jetted from the first oxygen gas jet port to the average flow rate of gases jetted from ports inner than the first oxygen gas jetport is controlled to fall into a proper range. Accordingly, the efficiency of mixture between raw material and oxyhydrogen gas can be enhanced. Thus, the quantity of oxygen diffused and supplied to the center portion can be increased without increasing the absolute quantity of oxygen gas (that is, without inducing a fall in temperature to thereby cause reduction in reaction efficiency) by a concentric multitubular burner which is easy to be manufactured. As a result, it is possible to produce a porous glass body with a high raw material yield.

Further, oxygen closest to raw material is diffused toward the center portion so effectively that a larger amount of oxygen can be fed to the raw material development area in the center portion. Thus, not only the hydrolytic reaction of $SiCl_4$ but also the hydrolytic reaction of $GeCl_4$ are accelerated remarkably. As a result, the reaction efficiencies of $SiCl_4$ and $GeCl_4$, particularly, that of $GeCl_4$, increases remarkably while the deposition speed is enhanced.

Further, by use of the mixed raw materials in which $GeCl_4$ is added to $SiCl_4$, the present invention can obtain the porous glass body with high raw material yield more effectively.

What is claimed is:

1. A method for producing porous glass body by a vapor phase synthesis method in which glass raw material gas undergoes a hydrolytic reaction or an oxidation reaction in flames, said method comprising:

using a glass particles synthesizing burner of a type comprising;
a center port group including:
a raw material gas jet port;
a combustible gas jet port; and
an oxygen gas jet port disposed outside the raw material gas jet port and combustible gas jet port,
wherein an outer wall of said oxygen gas jet port of said center port group more protrudes toward a head of said burner than an inner wall of said oxygen gas jet port, and a protruding length of said outer wall is not shorter than 30 times as large as a gap between an inner surface of the outer wall and an outer surface of the inner wall of said oxygen gas jet port: jetting the oxygen gas from said oxygen gas jet port of said center port group, with a flow rate which is not lower than 1.2 times as high as an average flow rate of gases jetted from ports inner than said oxygen gas jet port, the average flow rate being total flow rate of inner gases relative to the jet ports sectional area.

2. The porous glass body producing method according to claim 1, wherein said flow rate of oxygen gas jetted from said oxygen gas jet port of said center port group is not lower than 1.35 times as high as said average flow rate of gases jetted from ports inner than said oxygen gas jet port.

3. The porous glass body producing method according to claim 1, wherein said flow rate of oxygen gas jetted from said oxygen gas jet port of said center port group is not lower than 3.0 m/s.

4. The porous glass body producing method according to claim 1, wherein said flow rate of oxygen gas jetted from said oxygen gas jet port of said center port group is not higher than 50 m/s.

5. The porous glass body producing method according to claim 1, wherein time for all gases inner than said outer wall to pass inside said outer wall is not longer than 50 milliseconds.

* * * * *